(12) United States Patent
Anderson

(10) Patent No.: US 6,208,429 B1
(45) Date of Patent: Mar. 27, 2001

(54) METHOD AND SYSTEM FOR BAND PRINTING OF ROTATED DIGITAL IMAGE DATA

(75) Inventor: Eric C. Anderson, San Jose, CA (US)

(73) Assignee: FlashPoint Technology, Inc., San Jose, CA (US)

( * ) Notice: Subject to any disclaimer, the term of this patent is extended or adjusted under 35 U.S.C. 154(b) by 0 days.

(21) Appl. No.: 09/086,803

(22) Filed: May 29, 1998

(51) Int. Cl.[7] .................................................. G06F 15/00
(52) U.S. Cl. ..................... 358/1.18; 358/1.16; 358/1.17; 382/289; 382/293; 382/296; 382/297
(58) Field of Search .................................. 358/1.1, 1.12, 358/1.13, 1.14, 1.15, 1.16, 1.17, 1.18; 382/289, 293, 294, 296, 297; 348/230, 231, 232

(56) References Cited

U.S. PATENT DOCUMENTS

| | | |
|---|---|---|
| 4,271,476 * | 6/1981 | Lotspiech ............................ 382/296 |
| 4,703,515 * | 10/1987 | Baroody, Jr. ......................... 382/296 |
| 5,477,264 | 12/1995 | Sarbadhikari et al. ............... 348/231 |
| 5,633,678 | 5/1997 | Parulski et al. ...................... 348/232 |
| 5,825,988 | 10/1998 | Collard et al. ....................... 395/112 |

\* cited by examiner

*Primary Examiner*—Edward L. Coles
*Assistant Examiner*—Mark Wallerson
(74) *Attorney, Agent, or Firm*—Sawyer Law Group LLP

(57) ABSTRACT

Method and system aspects for increasing print performance for rotated digital images are described. A method aspect, and system for providing same, includes analyzing a selected image print layout to determine at least a number and size of rotated images in the selected image print layout. Further included is allocating available rotate buffer space to the rotated images based on at least the number and size of the rotated images, and executing band printing of the selected print layout.

25 Claims, 8 Drawing Sheets

METHOD AND SYSTEM FOR BAND PRINTING OF ROTATED DIGITAL IMAGE DATA

FIELD OF THE INVENTION

The present invention relates to digital image data printing, and more particularly to a method and system for band printing rotated digital image data.

BACKGROUND OF THE INVENTION

Digital image data production has become increasingly utilized with the advancement of digital image data capture devices, the prevalence of image intensive home pages and websites on the World Wide Web, and improvements in digital image output devices, including band printers. Image production via band printing sometimes encounters difficulties when print orientations differ from captured orientations, e.g., landscape images printed in portrait layouts. FIG. 1 illustrates an example of a single page portrait layout of four images, where three of the images 10, 12, and 14 are landscape images, and one image 16 is a portrait image 16. A band printer, for example, an inkjet printer, normally prints in a predetermined direction, e.g., left to right, across a page from top to bottom. Thus, when band printing images 10, 12, 14, and 16, images 10 and 12 would be printed first as the page is printed from top to bottom. However, in order to print these images, the stored image data for these images requires rotation, since the order of the data in storage for the landscape image does not match the order necessary for printing in a portrait orientation.

Rotating received image data to form a printing band is often a slow and repetitive process. Typical band printing of rotated image data includes decompressing the entire image to then select the portion of the decompressed image data that is appropriate for the current printing band. While all systems must have enough memory to hold a single print band of image data, most systems do not include enough memory to store decompressed and rotated image data from an entire image during band printing. Thus, for each printing band, the entire image must be redecompressed in order to obtain the appropriate data for the current printing band.

One method to achieve more efficient printing of rotated images is to provide a print buffer large enough to hold an entire image's worth of decompressed and rotated image data. Unfortunately, in order to provide enough memory to accommodate any potential image size is impractical and cost-prohibitive for most systems.

What is needed is a method and system of increasing print performance of rotated images with efficient use of memory. The present invention addresses such a need.

SUMMARY OF THE INVENTION

The present invention provides method and system aspects for increasing print performance for rotated digital images. A method aspect, and system for providing same, includes analyzing a selected image print layout to determine at least a number and size of rotated images in the selected image print layout. Further included is allocating available rotate buffer space to the rotated images based on at least the number and size of the rotated images, and executing band printing of the selected print layout.

With the present invention, an effective and efficient utilization of memory during band printing of rotated images is achieved. The utilization maintains preferred functionality and performance across image sizes and readily scales with increased memory provisions. These and other advantages of the aspects of the present invention will be more fully understood in conjunction with the following detailed description and accompanying drawings.

DETAILED DESCRIPTION OF THE INVENTION

The present invention relates to an improvement in band printing of rotated image data. The following description is presented to enable one of ordinary skill in the art to make and use the invention and is provided in the context of a patent application and its requirements. Although the present invention will be described in the context of a digital camera, various modifications to the preferred embodiment will be readily apparent to those skilled in the art and the generic principles herein may be applied to other embodiments. For example, although the aspects of the present invention are described as a part of a digital camera's operations, they may also be achieved through a suitably equipped printer itself, if desired. Further, provision of the described processes of the present invention is capable via an appropriate computer readable medium. Thus, the present invention is not intended to be limited to the embodiment shown, but is to be accorded the widest scope consistent with the principles and features described herein.

Figure 2:
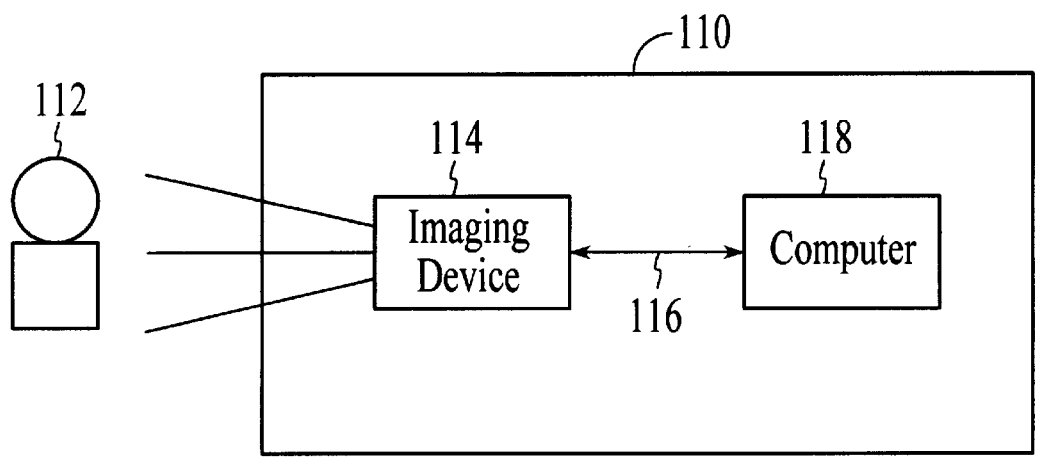
FIG. 2 is a block diagram of a digital camera that operates in accordance with the present invention.

FIG. 2 is a block diagram of a digital camera 110 shown for use in accordance with the present invention. Camera 110 preferably comprises an imaging device 114, a system bus 116 and a computer 118. Imaging device 114 is optically coupled to an object 112 and electrically coupled via system bus 116 to computer 1 18. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory.

Figure 3:
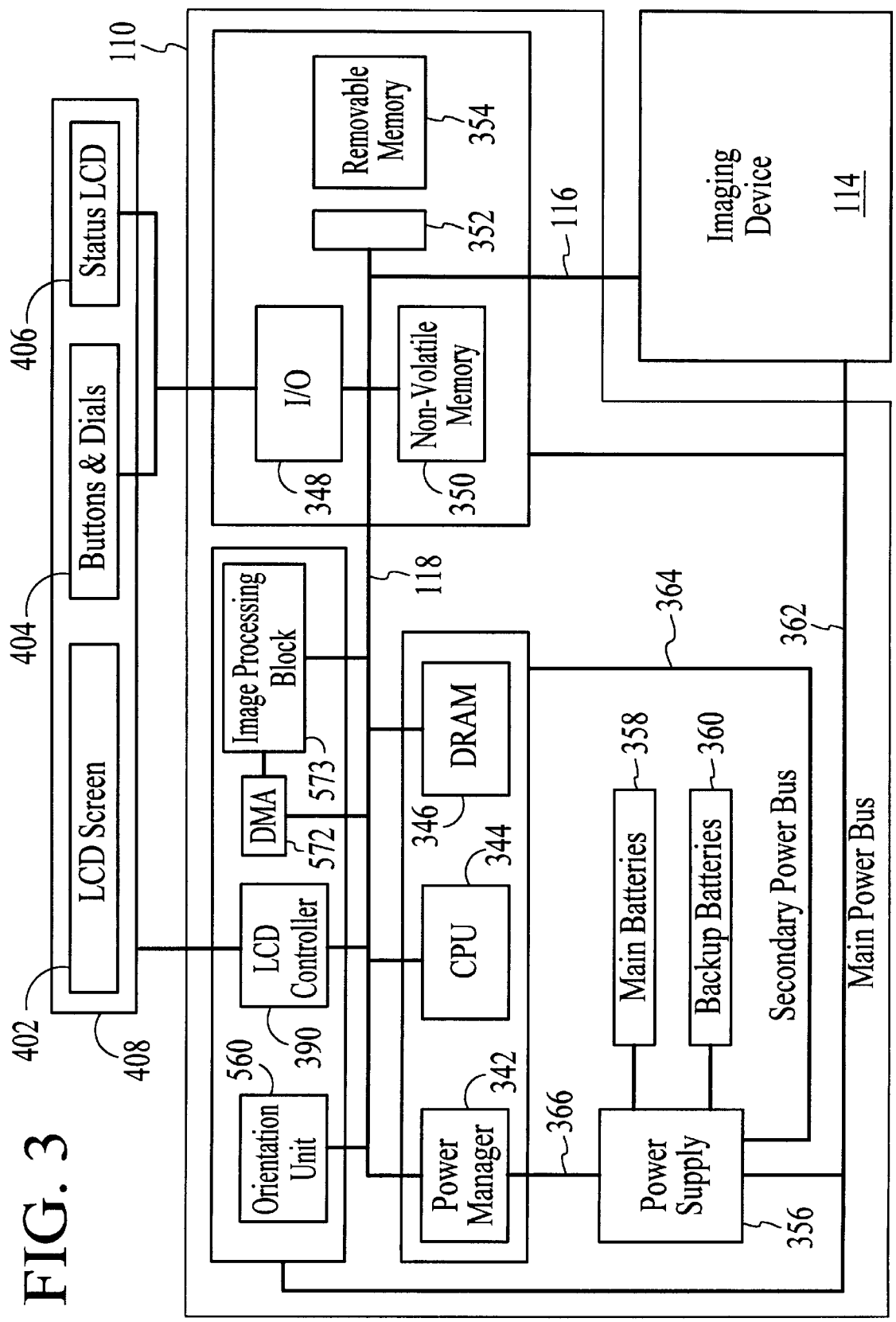
FIG. 3 is a block diagram of one embodiment for the computer of FIG. 2, where image processing is done at least partially in hardware.

Referring now to FIG. 3, a block diagram of one embodiment for computer 118 is shown. In one embodiment, the computer 118 in FIG. 3 provides at least a portion of image processing in hardware using image processing block 573. Thus, in one embodiment the computer 118 has DMA unit 572 for transfers of data to and from the image processing block 573. However, nothing prevents the method and system from being used in a camera 110 which processes image data in software. In such a system, the image processing block 573 would be omitted. In one embodiment, DMA 572 is programmable by the central processing unit (CPU) 344.

System bus 116 provides connection paths between imaging device 114, an optional power manager 342, CPU 344, dynamic random-access memory (DRAM) 346, input/output interface (I/O) 348, nonvolatile memory 350, DMA 572, image processing block 573, orientation unit 560, and buffers/connector 352. Removable memory 354 connects to system bus 116 via buffers/connector 352. Alternately, camera 110 may be implemented without removable memory 354 or buffers/connector 352. The orientation unit 560 can sense which position the digital camera 110 is currently in. The orientation unit 560 also sends signals to the CPU 344 indicating the current orientation of the digital camera 110.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multithreaded environment. DRAM 346 is a contiguous block of dynamic memory which may be selectively allocated to various storage functions. LCD controller 390 accesses DRAM 346 and transfers processed image data to LCD screen 402 for display.

I/O 348 is an interface device allowing communications to and from computer 118. For example, I/O 348 permits an external host computer (not shown) to connect to and communicate with computer 118. I/O 348 also interfaces with a plurality of buttons and/or dials 404, and an optional status LCD 406, which in addition to the LCD screen 402, are the hardware elements of the camera's user interface 408.

Nonvolatile memory 350, which may typically comprise a conventional read-only memory or flash memory, stores a set of computer-readable program instructions to control the operation of camera 110. Removable memory 354 serves as an additional image data storage area and is preferably a nonvolatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. In one embodiment, removable memory 354 is implemented using a flash disk. Power supply 356 supplies operating power to the various components of camera 110. In one embodiment, power supply 356 provides operating power to a main power bus 362 and also to a secondary power bus 364. The main power bus 362 provides power to imaging device 114, I/O 348, nonvolatile memory 350, LCD controller 390, orientation sensor 560, DMA 572, image processing chain 573, and removable memory 354. The secondary power bus 364 provides power to power manager 342, CPU 344 and DRAM 346.

Power supply 356 is connected to main batteries 358 and also to backup batteries 360. In one embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. During a power failure mode in which the main batteries 358 have failed (when their output voltage has fallen below a minimum operational voltage level) the backup batteries 360 provide operating power to power supply 356 which then provides the operating power only to the secondary power bus 364 of camera 110.

Figure 4:
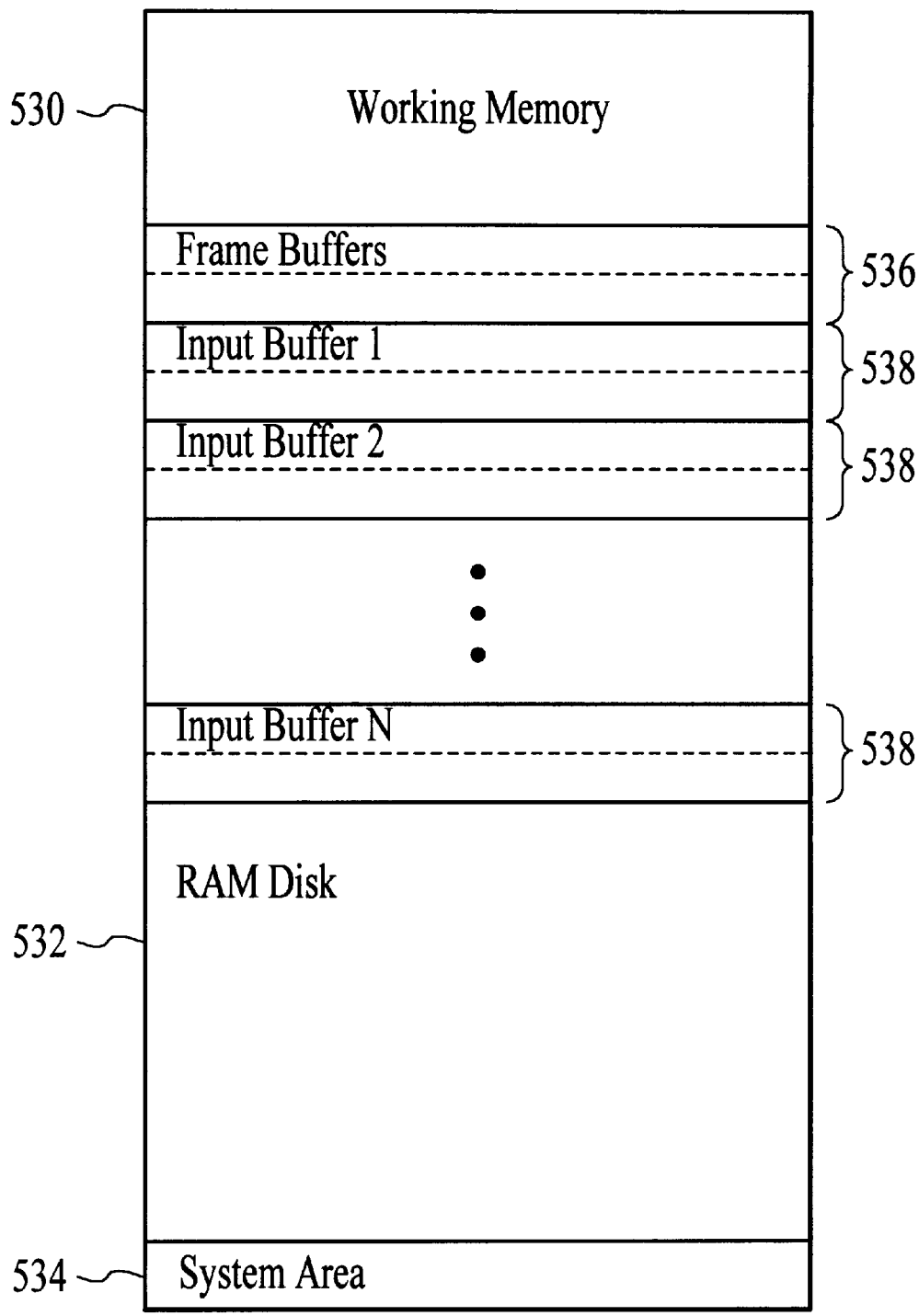
FIG. 4 is a memory map showing one embodiment of the Dynamic Random-Access-Memory (DRAM).

Referring now to FIG. 4, a memory map for one embodiment of dynamic random-access-memory (DRAM) 346 is shown. In the preferred embodiment, DRAM 346 includes RAM disk 532, a system area 534, and working memory 530.

RAM disk 532 is an optional memory area used for storing raw and compressed image data and typically is organized in a "sectored" format similar to that of conventional hard disk drives. In one embodiment, RAM disk 532 uses a well-known and standardized file system to permit external host computer systems, via I/O 348, to readily recognize and access the data stored on RAM disk 532. System area 534 typically stores data regarding system errors (for example, why a system shutdown occurred) for use by CPU 344 upon a restart of computer 118.

Working memory 530 includes various stacks, data structures and variables used by CPU 344 while executing the software routines used within computer 118. Working memory 530 also includes several input buffers or one input buffer 538 for temporarily storing sets of raw image data received from imaging device 114, and a frame buffer 536 for storing data for display on the LCD screen 402. In a preferred embodiment, each input buffer 538 and the frame buffer 536 are split into two separate buffers, called ping-pong buffers (shown by the dashed lines), to improve the display speed of the digital camera and to prevent the tearing of the image in the display 402.

Each separate buffer of the input buffers 538 alternates between an input cycle and a processing cycle. During the input cycle, the input buffers 538 are filled with raw image data from the imaging device 114, and during the processing cycle, CPU 344 processes the raw data and transmits the processed data to the frame buffers 536. For example, during the execution of a live view generation process, the CPU 344 takes the raw image data from the input buffers 538, typically in CCD format, and performs color space conversion on the data. The conversion process performs gamma correction and converts the raw CCD data into either a RGB or YCC color format which is compatible with the LCD screen 402. (RGB is an abbreviation for Red, Green, Blue, and YCC is an abbreviation for Luminance, Chrominance-red and Chrominance-blue). After converting the data to YCC, the YCC image data is stored in the frame buffer 536. The LCD controller 390 then transfers the processed image data from the frame buffers to the LCD screen 402 for display.

Figure 5:
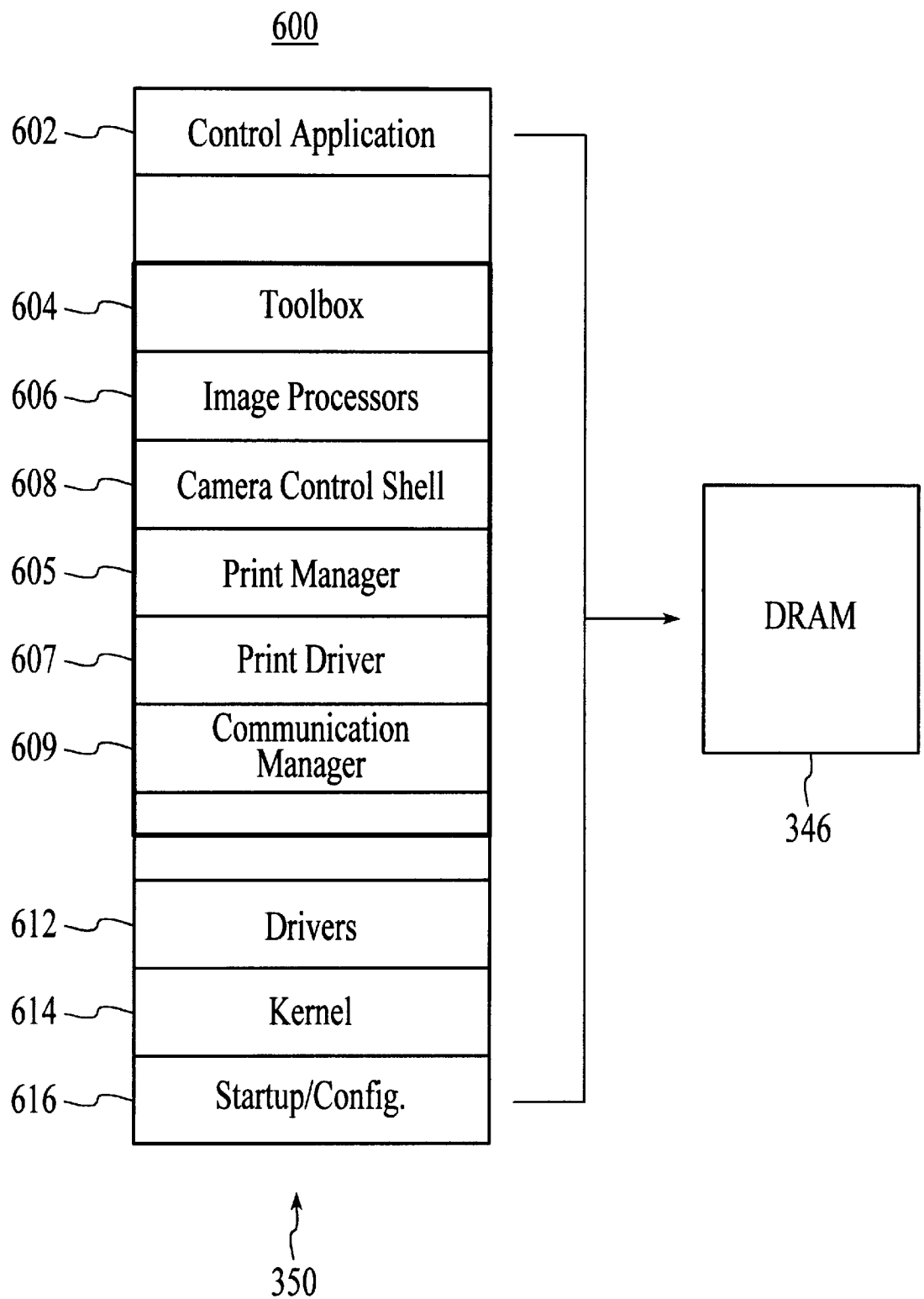
FIG. 5 is a block diagram illustrating the contents of the nonvolatile memory where software is stored and the DRAM where the software is executed.

FIG. 5 is a block diagram illustrating the contents of nonvolatile memory 350 where software 600 is stored and DRAM 346 where the software is executed. The software 600 may include a control application 602, a toolbox 604, drivers 612, a kernel 614, and a startup/configuration module 616. The control application 602 is the main program that controls high-level functions of the digital camera 110 and is responsible for interfacing with functions in the toolbox 604. The toolbox 604 comprises selected function modules that control how the digital camera 110 captures and manipulates images. The modules may include image processors 606, a camera control shell 608, and a script interpreter 610. Image processors 606 are programs for enhancing (e.g., adjusting the contrast, sharpening, converting the image to gray-scale, etc.) the digital image received from the imaging device 114. Camera control shell 608 receives and processes data structures for controlling camera functions. Drivers 612 comprise program instructions for controlling various camera 110 hardware components, such as motor and a flash (not shown). Kernel 614 comprises program instructions providing basic underlying camera services including synchronization routines, task creation, activation and deactivation routines, resource management routines, etc. Startup/configuration 616 comprises program instructions for providing initial camera 110 start-up routines such as the system boot routine and system diagnostics.

When the camera 110 is first turned on and booted up, the startup/configuration module 616 begins to execute and loads the drivers 612, the kernel 614, the control application 602, and system files containing configuration information into DRAM 346. Thereafter, operation of the camera 110 is passed to the control application 602. In the context of printing for the present invention, a printing application interacts with the toolbox layer 604. Within the toolbox layer 604, a print manager 605 suitably manages the processes of printing, e.g., calling appropriate routines such as calls to the graphics processes, conversion to the right resolution and data space, etc., in order to generate printing bands in order. The print manager 605 passes the printing bands to a print driver 607 in the toolbox layer 604 that converts the band to the appropriate format to print individual drops of ink, i.e., the print driver is responsible for the half-toning algorithm, and communicates the bands via a communication manager 609. The communication manager 609 suitably communicates the data to an input/output driver in the drivers 612 for output to the printing hardware (not shown). It should be appreciated that although the operations are described in terms of operations within the digital camera, alternatively the processes are suitably provided within and performed by a printer.

Figure 1:
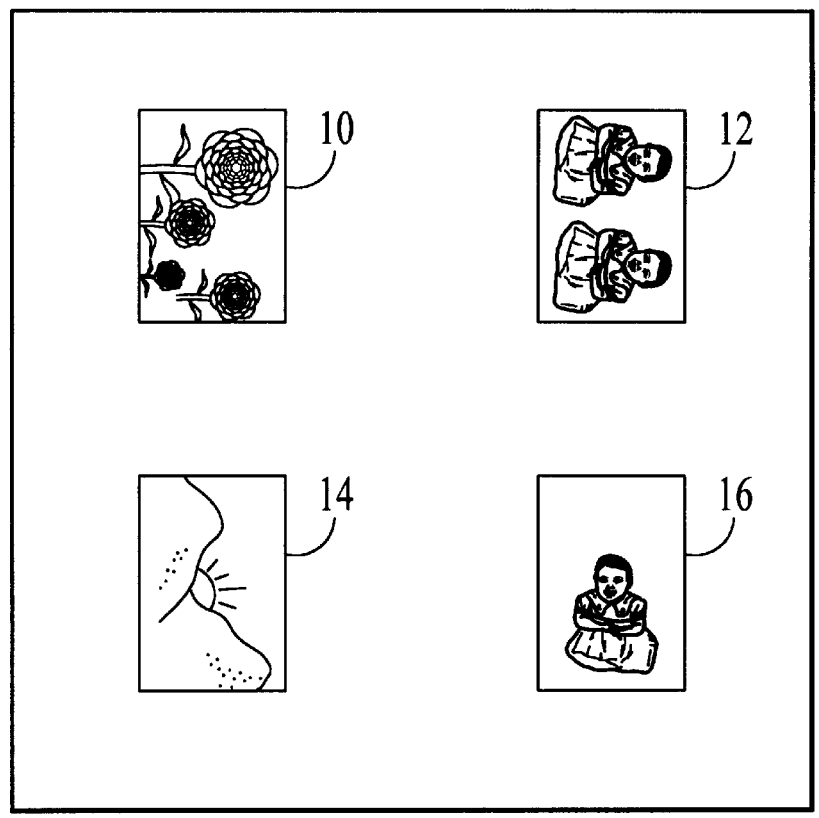
FIG. 1 illustrates a representation of a portrait print layout that includes landscape images requiring data rotation.
Figure 6:
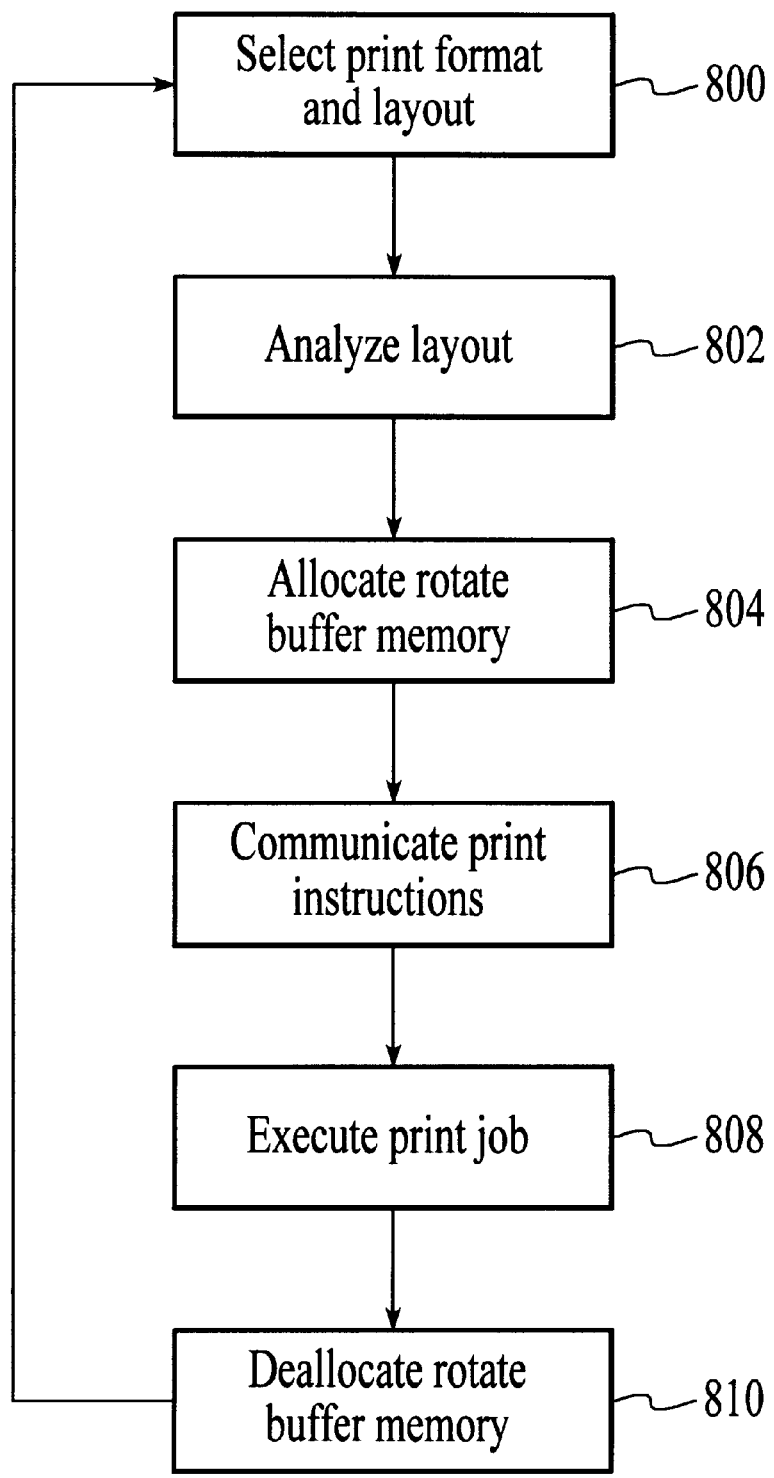
FIG. 6 illustrates a flow diagram of a process for band printing of rotated image data with efficient utilization of memory in accordance with the present invention.

In the output production of images, a process for band printing of image data in accordance with a preferred embodiment of the present invention is presented with reference to FIG. 6. When printing images, a user first selects the desired print format and layout of images (step 800), for example, the layout of FIG. 1. An analysis of the selected layout is suitably performed (step 802) by an application performing the print job in a preferred embodiment, or alternatively, by print manager 605 in toolbox 604 (FIG. 5). Preferably, during analysis, a determination of how many of the selected images need rotation and where these rotated images are placed within a page is made, as well as an analysis of the sets of images to be handled and how big the images are. For the example layout of FIG. 1, there are four total images, with two sets of two images, and three images 10, 12, and 14 that require rotation. The images 10 and 12 form one set, while images 14 and 16 form a second set of images.

Once the analysis is completed, rotation buffer space is allocated to the images (step 804) by the device performing the print function. Allocation preferably occurs by dividing the available rotation memory (e.g., a selected portion of DRAM 346) into a number of portions equal to the number of rotated images in a given set. Thus, for the example of FIG. 1, the available rotation buffer is suitably divided into two portions for images 10 and 12 of the first set, while the entire rotation buffer would be available for image 16 of the second set. In dividing the available rotation buffer into portions, a preferred embodiment accounts for image resolution. By way of example, if image 10 is a VGA (video graphics array) image, while image 12 is a megapixel image, image 12 would have approximately times the resolution of image 10, as is well appreciated by those skilled in the art. Preferably, then, rather than allocating one half of the available rotation buffer space to each image 10 and 12, image 12 would be allocated approximately three times the space allocated for image 10. Thus, the allocation may be effectively weighted such that images of higher resolution receive a larger portion of the buffer than those of lower resolution. Of course, mere division into equal portions is an alternate and suitable allocation strategy. In the example of the second set of images, since image 16 is the only image requiring rotation, the entire available rotation buffer would be allocated to it.

Figure 7:
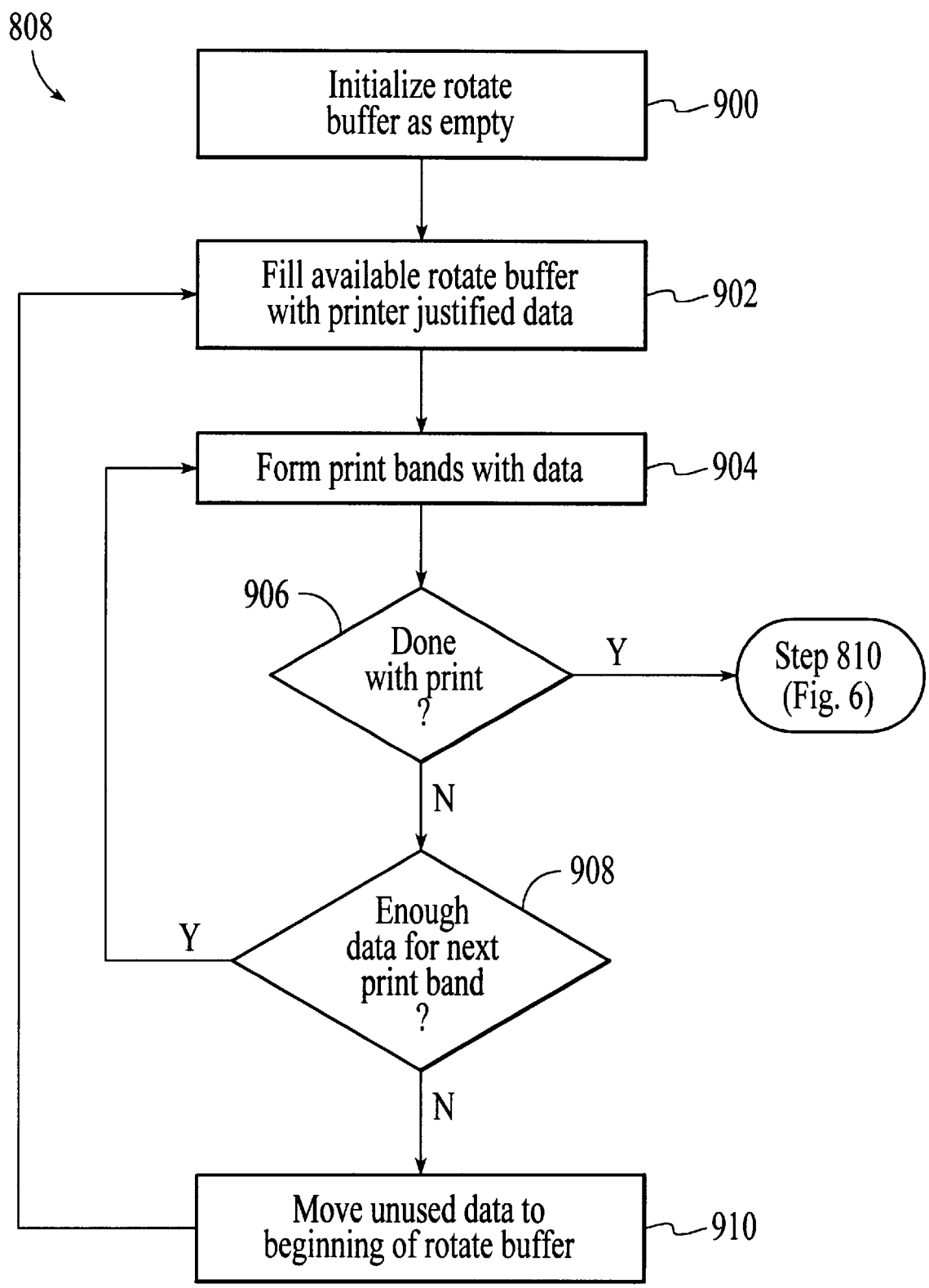
FIG. 7 illustrates a flow diagram of a process for print execution (step 808, FIG. 6) in accordance with the present invention.

The print directions and pointers to the available rotate buffers are then suitably passed to the print manager (step 806) for execution of the print job by the print manager (step 808), which is described in greater detail with reference to FIG. 7. Once execution is completed, the rotation buffer space is returned/deallocated (step 810) for use with a next potential printing job.

Figure 8A:
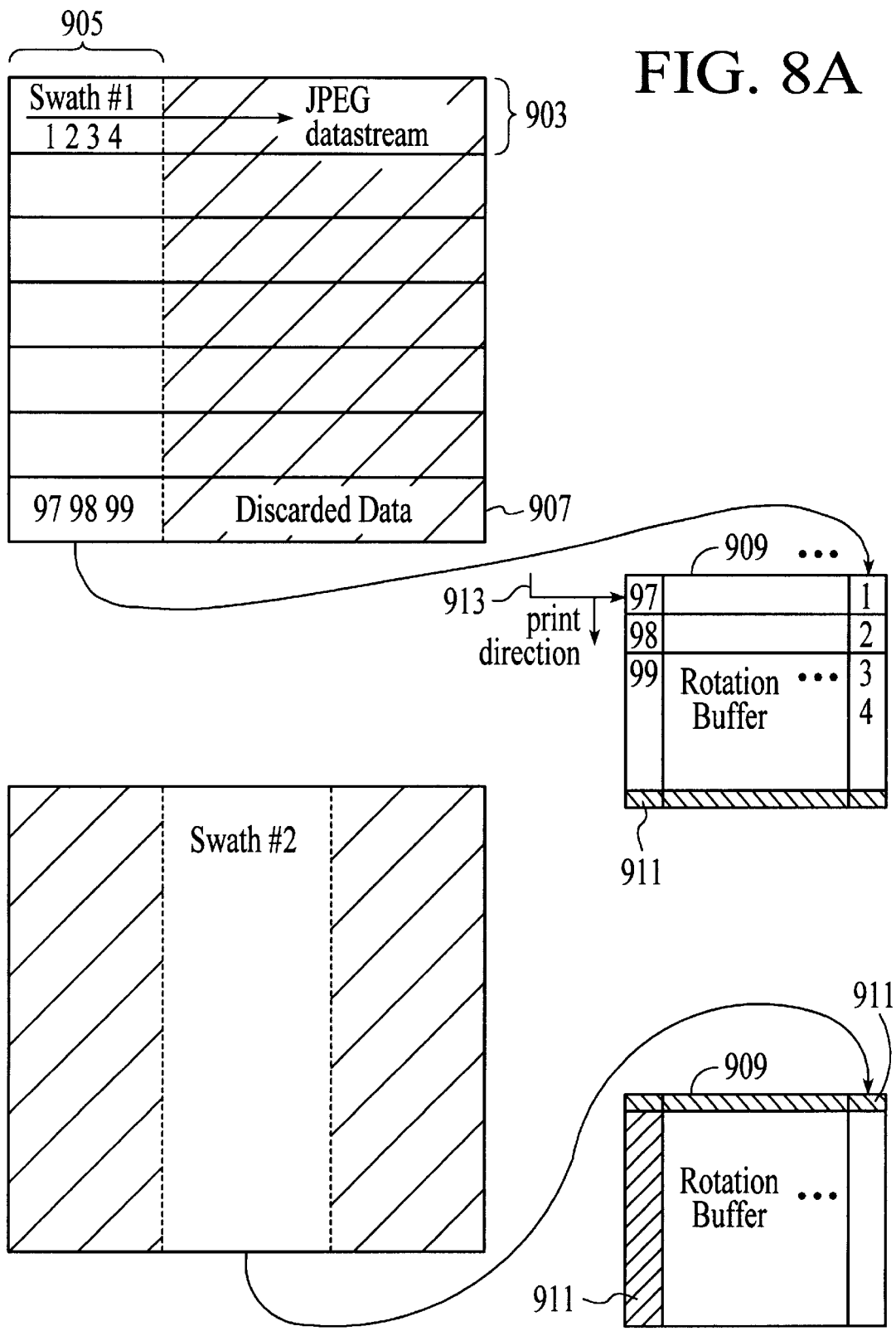
FIGS. 8a and 8b illustrate a process for filling available rotate buffer space (step 902, FIG. 7), schematically and in a flow diagram, respectively, in accordance with the present invention.
Figure 8B:
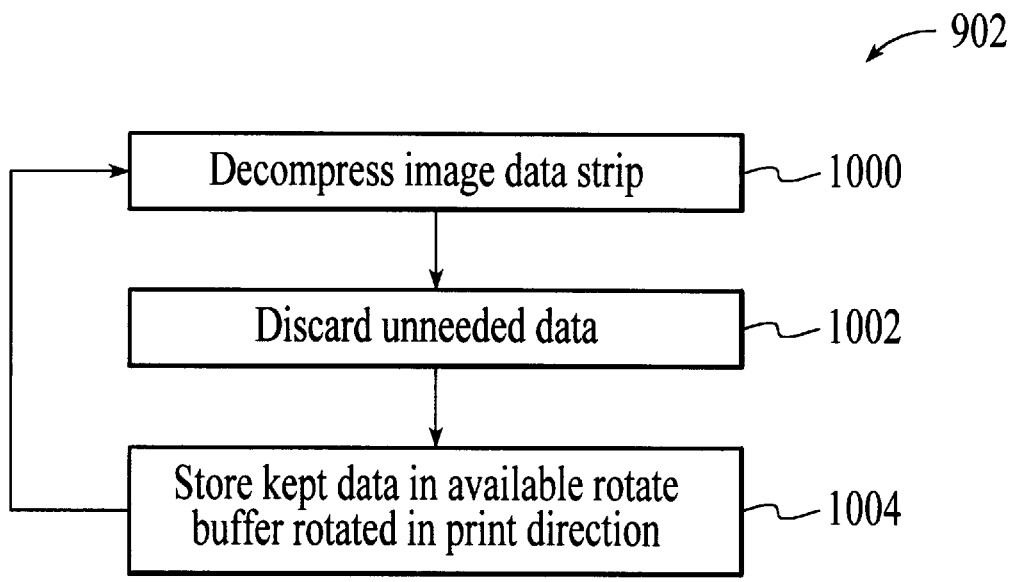

In order to print the images, the print manager executes the print job by calling appropriate routines to manage the process of printing. Referring now to FIG. 7, the execution begins with an initialization of the available rotation buffer as empty (step 900). The available rotation buffer is then filled with printer justified image data (step 902), as described with reference to FIGS. 8a and 8b. In filling the available rotation buffer with image data, the print manager suitably makes a call for decompression processing, e.g., a JPEG (Joint Photographic Experts Group) decompression routine. Referring to FIG. 8a, a strip 903 of the image data (e.g., 16 lines) of an image in a current print set is suitably decompressed (step 1000, FIG. 8b), e.g., via the chosen decompression routine of the system, where the direction of the datastream from JPEG is from left to right as indicated. In decompressing the image data, only portions of each strip 903 of image data are necessary to fill the rotation buffer, i.e., a swath 905 of the image being printed, since the image's orientation in the print layout differs from that in which its data is stored. Any unnecessary decompressed data of the strip 903 is discarded (step 1002, FIG. 8b), as indicated by the shaded portion 907 of FIG. 8a. The kept decompressed data of each image is rotated for the print direction and stored in the rotation buffer 909 (step 1004, FIG. 8b). This continues until an entire swath 905 is rotated into the rotation buffer 909. For example, as shown in FIG. 8a, the numerals '1 2 3 4' represent data from a first strip 903 for swath 905 that is decompressed, rotated, and placed in the available rotation buffer 909, while numerals '97 98 99' represent data from a last strip of swath 905 that is decompressed, rotated, and placed in the available rotation buffer 909. As is further shown, through the preferred decompression, rotation, and placement, the data '1 2 3 4' and '97 98 99' is stored in the proper order and direction for printing, indicated by arrow 913.

Alternatively, the print manager determines whether an MCU (minimum computation unit) is in a swath/portion 905 of the image being printed, an MCU referring to a 16×16 or 8×8 block, discrete cosine transfer element (DCT), which is part of the JPEG method. When the MCU is in the swath, it is rotated into the rotation buffer 909. When the MCU is not in the swath, it is discarded. By decoding enough data to identify where each block begins and ends, only the data needed for a current swath is fully decoded to optimize the filling of the rotation buffer. For JPEG, this can be done by doing the huffrnan decoding step without the computation intensive inverse DCT step. Preferably then, the available rotation print buffer for each rotated image holds as much rotated data provided in the direction of printing as possible, and the overhead is reduced since the decoding may skip fully decoding an unneeded swath.

Taking this one step further, an index table can be suitably generated of the location of each MCU block that is located at the left side of each swath. The index then allows direct access to the swath for decoding subsequent swaths, eliminating all additional decoding overhead. A pre-scan of the JPEG data can be performed to build the index table. This method has the advantage of being simpler, but has the additional overhead of doing the huffman decoding step twice rather than once for the first swath, as is well appreciated by those skilled in the art.

Note that in any of the MCU based approaches, preferably the rotation buffer size is set to fit an integer number of MCUs. This further simplifies the process and reduces the overhead, since no MCU requires full decoding twice, only once for each swath for which the MCU is a part. Alternatively, the rotation buffer is provided with a size that is a multiple of 16 lines to make a full integer number of JPEG bands/strips of a swath fit in the buffer.

Referring back to FIG. 7, the image data in the rotation buffer is then utilized to form print bands (step 904), as is typically performed and well understood by those skilled in the art. For example, a resizer accepts a line of data at a time from the rotation buffer (e.g., a row of data [97 . . . 1] from rotation buffer 909, FIG. 8*a*) and outputs lines to a band generator. By way of further example, when a multiple of 16 lines is provided in the rotation buffer to make the integer number of JPEG bands/strip fit in the buffer, the lines in a first swath are fed from the rotation buffer to the resizer, and when the rotation buffer is empty, it is refilled with a next swath for feeding to the resizer until the image is done. When done with the printing of the image(s), as determined via step 906, the execution is finished and the process returns to step 810, FIG. 6, for rotate buffer deallocation. When the image(s) are not completely printed, a determination of whether enough data is present in the rotation buffer to create the next print band occurs (step 908). When there is enough data for a next print band in the buffer, the process returns to step 904 for utilization of the data to form a print band. When there is not enough data for a next print band, print execution continues by moving any remaining, unused data in the rotation buffer (portion 911, FIG. 8*a*) to the beginning of the rotation buffer 909 (step 910). As shown in FIG. 8*a*, moving the data in this manner thus supports multi-tap filters being used to resize the data, and accounting for print bands that do not usually take multiples of 16 lines at a time. The process then returns to step 902 to fill the available buffer with more printer justified image data (e.g., from a next swath, Swath #2, FIG. 8*a*) as described above, to continue print execution until there is no more image data to print.

Alternatively, if the resizer maintains all filter tap buffers internally, and receives a line at a time input with controlled output to the print band buffer (i.e., can hold lines that remain to be output from already taken input lines when the band is complete, to be used to start the next print band later), then the process in FIG. 7 always runs until all lines have been used in the rotation buffer. When the last line has been used, the next swath is loaded, as previously described.

Figure 9:
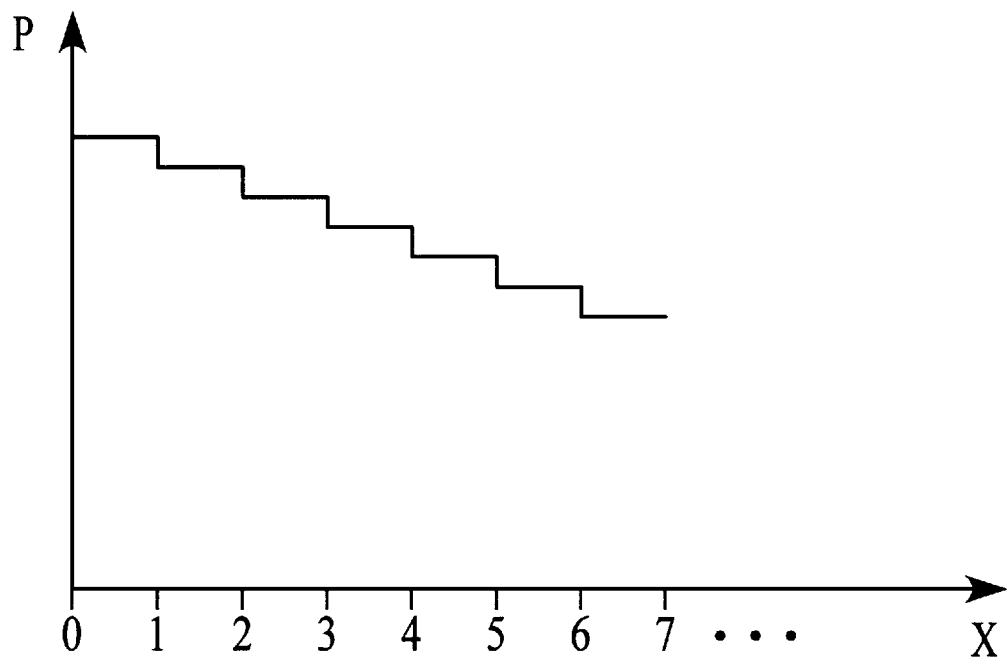
FIG. 9 illustrates a graph representation of printing performance in accordance with the present invention.

While redecompression of the current image(s) occurs through the routine associated with step 902 (FIG. 8*b*), the number of redecompressions in the present invention is related to how the image size compares to the available buffer size, rather than on the number of printing bands. For example, FIG. 9 illustrates printing performance, 'P', versus the number of times bigger the rotated image is than the available rotation buffer space, 'X'. If the available rotation buffer is large enough to hold an entire image's decompressed and rotated data (i.e., 'X' is between 0 and 1), only one decompression/rotation is needed for that image, and the printing performance (e.g., printing rate) is at an optimal level. For an image that is larger than the buffer but less than twice the available rotation buffer size (i.e., 'X' is between 1 and 2), the print performance drops slightly. For each subsequent increase in image size for the given rotation buffer size, there is a gradual decrease in performance as shown in FIG. 9, rather than a "step function" decrease in performance that is typically seen in most decompression schemes, which require full decompression of an image for each printing band. Of course, with the addition of more memory to improve performance, the present invention achieves even more gradual performance degradation by increasing the possibility that an entire image's worth of decompressed and rotated data will fit in the available buffer space, i.e., the effective distance between 'X' values 0 and 1, 1 and 2, etc., of FIG. 9 is increased. Thus, the present invention is readily scaleable with memory additions. It should be further noted that if a "pre-scan" approach is used, the total overhead for a rotated image will not be much higher for any number of swaths than that for a non-rotated image.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for increasing print performance for rotated digital images, the method comprising:

a) analyzing a selected image print layout to determine at each a number and size of rotated images in the selected image print layout, including determining a number of sets of images in the selected print layout and the number and size of the rotated images within each set of images;

b) allocating available rotate suffer space to the rotated images based on at least the number and size of the rotated images; and c) executing hand printing of the selected print layout.

2. The method of claim 1 wherein the allocating step (b) further comprises dividing the available rotate buffer equally among the rotated images determined to be in each set.

3. The method of claim 1 wherein the allocating step (b) further comprises dividing the available rotate buffer according to the resolution of the rotated images in each set.

4. The method of claim 3 wherein rotated images with a higher resolution are allocated a larger portion of the available rotate buffer than rotated images with a lower resolution.

5. The method of claim 1 wherein the executing band printing step (c) further comprises:
   c1) initializing the available rotate buffer as empty;
   c2) filling the available rotate buffer with decompressed, rotated, and printer justified image data; and
   c3) utilizing the printer justified image data to form print bands.

6. The method of claim 5 wherein filling step (c2) further comprises avoiding decompression of data in an unneeded swath of a rotated image to reduce overhead during the step of filling.

7. The method of claim 5 further comprising determining whether the printing is complete, wherein when the printing is not complete, a determination of whether enough printer justified image data remains in the available rotate buffer to form a next print band is made.

8. The method of claim 7 wherein when there is not enough printer justified image data to form a next print band, any remaining printer justified image data in the available rotate buffer is moved to the beginning of the available rotate buffer.

9. The method of claim 8 further comprising filling the available rotate buffer with additional decompressed, rotated and printer justified image data.

10. The method of claim 5 further comprising providing the available rotate buffer space with a size that is a multiple of a chosen number of lines to hold a swath of image data, feeding the lines in a first swath of image data from the available rotate buffer space to a resizer, and when the available rotate buffer space is empty, refilling the available rotate buffer space with a next swath for feeding to the resizer until the image is done.

11. A method for more efficient utilization of memory during band printing of image data that requires rotation, the method comprising:
   analyzing a selected print layout of digital images to identify one or more sets of images having at least one rotated image;
   allocating rotate buffer memory wider than a single printing band to the at least one rotated image of a current set; and
   filling the allocated rotate buffer memory with decompressed and rotated image data from the at least one rotated image to reduce a total number of decompressions and rotations of the at least one rotated image below a total number of printing bands.

12. The method of claim 11 wherein allocating further comprises dividing the rotate buffer memory into a number of buffer portions equal to a number of rotated images in the current set.

13. The method of claim 12 wherein dividing further comprises adjusting a size of each buffer portion for the current set in accordance with a resolution associated with each rotated image in the current set.

14. The method of claim 13 wherein the size of a buffer portion is larger for a rotated image of a higher resolution than another rotated image in the current set.

15. The method of claim 11 wherein in the step of filling, the decompressed and rotated image data is stored in the direction of printing.

16. The method of claim 11 wherein the number of decompressions and rotations of the at least one rotated image for the step of filling depends on a size differential between the at least one rotated image and the rotate buffer memory.

17. A system for increasing print performance for rotated digital images, the system comprising:
   memory for storing digital image data, including rotate buffer memory and
   an image processor coupled to the memory, the image processor analyzing a selected image print layout to determine at least a number and size of rotated images in the selected image print layout, allocating available rotate suffer space of the rotate buffer memory to the rotated images based on at least the number and sire of the rotated images, and executing hand printing of the selected print layout, wherein the image processor in analyzing further determines a number of sets of images in the selected print layout and the number and size of the rotated images within each set of images.

18. The system of claim 17 wherein the image processor in allocating further divides the available rotate buffer according to the resolution of the rotated images in each set.

19. The system of claim 18 wherein the image processor allocates a larger portion of the available rotate buffer to the rotated images with a higher resolution.

20. The system of claim 17 wherein the image processor in executing band printing further initializes the available rotate buffer as empty, fills the available rotate buffer with decompressed, rotated, and printer justified image data, and utilizes the printer justified image data to form print bands.

21. The system of claim 20 wherein the image processor further determines whether the printing is complete, wherein when the printing is not complete, the image processor determines whether enough printer justified image data remains in the available rotate buffer to form a next print band.

22. The system of claim 21 wherein when there is not enough printer justified image data to form a next print band, the image processor moves any remaining printer justified image data in the available rotate buffer to the beginning of the available rotate buffer.

23. The system of claim 22 wherein the image processor further fills the available rotate buffer with additional decompressed, rotated and printer justified image data.

24. The system of claim 17 wherein the rotate buffer memory comprises a multiple of 16 lines of buffer space.

25. A computer readable medium containing program instructions for increasing print performance for rotated digital images, the program instructions comprising:
   analyzing a selected image print layout to determine at least a number and size of rotated images in the selected image print layout, including determining a number of sets of images in the selected print layout and the number and size of the rotated images within each set of images;
   allocating available rotate buffer space to the rotated images based on at least the number and size of the rotated images; and
   executing band printing of the selected print layout.

* * * * *

UNITED STATES PATENT AND TRADEMARK OFFICE
CERTIFICATE OF CORRECTION

PATENT NO.   : 6,208,429 B1  
DATED        : March 27, 2001  
INVENTOR(S)  : Anderson It is certified that error appears in the above-identified patent and that said Letters Patent is hereby corrected as shown below:

Column 6,
Line 6, should read: would have approximately three (3) times the

Column 8,
Line 54, "suffer" should read "buffer"
Line 57, "hand" should read "band"

Column 10,
Line 14, "sire" should read "size"
Line 15, "hand" should read "band"

Signed and Sealed this

Sixteenth Day of October, 2001

Attest:

NICHOLAS P. GODICI
Attesting Officer    Acting Director of the United States Patent and Trademark Office